Jan. 2, 1968 R. O. WHITAKER 3,361,946

VARIABLE CAPACITOR WITH TWO-SPEED MOVEMENT

Filed Aug. 31, 1966 2 Sheets-Sheet 1

United States Patent Office 3,361,946

Patented Jan. 2, 1968

3,361,946

VARIABLE CAPACITOR WITH TWO-SPEED MOVEMENT

Ranald O. Whitaker, 3145 N. Delaware, Indianapolis, Ind. 46205

Filed Aug. 31, 1966, Ser. No. 576,786
10 Claims. (Cl. 317—254)

This invention relates to UHF tuners of the type used in domestic TV receivers. It provides two-speed tuning of the ganged variable capacitor generally used in such tuners.

According to the invention only one rotor plate of each section of the UHF tuner is fixed to the UHF tuning shaft. This plate turns whenever the tuning shaft is turned. The tuning shaft is dead zone coupled to a sleeve which carries the remainder of the rotor plates. Within the dead zone, rotation of the tuning shaft rotates only the single plate of each section. This gives vernier adjustment of the resonant frequency of the tuner. Upon reaching the limit of the dead zone, the tuning shaft picks up the sleeve and thereafter rotates all the rotor plates. This gives coarse adjustment of the resonant frequency.

In using the system the operator rotates the tuning shaft until the desired station is passed by a small amount. He then reverses the direction of rotation. The sleeve bearing the majority of the rotor plates does not turn with the initial portion of this reverse rotation. Only the aforementioned single rotor plates of each section turn. This gives vernier action, permitting the operator to tune the station with high precision.

Two-speed tuning is generally available on UHF tuners today. However, the drives presently used usually require a mechanism exterior to the tuner itself.

The object of the present invention is to provide a UHF tuner in which the two-speed tuning action is accomplished within the tuner.

Figure 1:
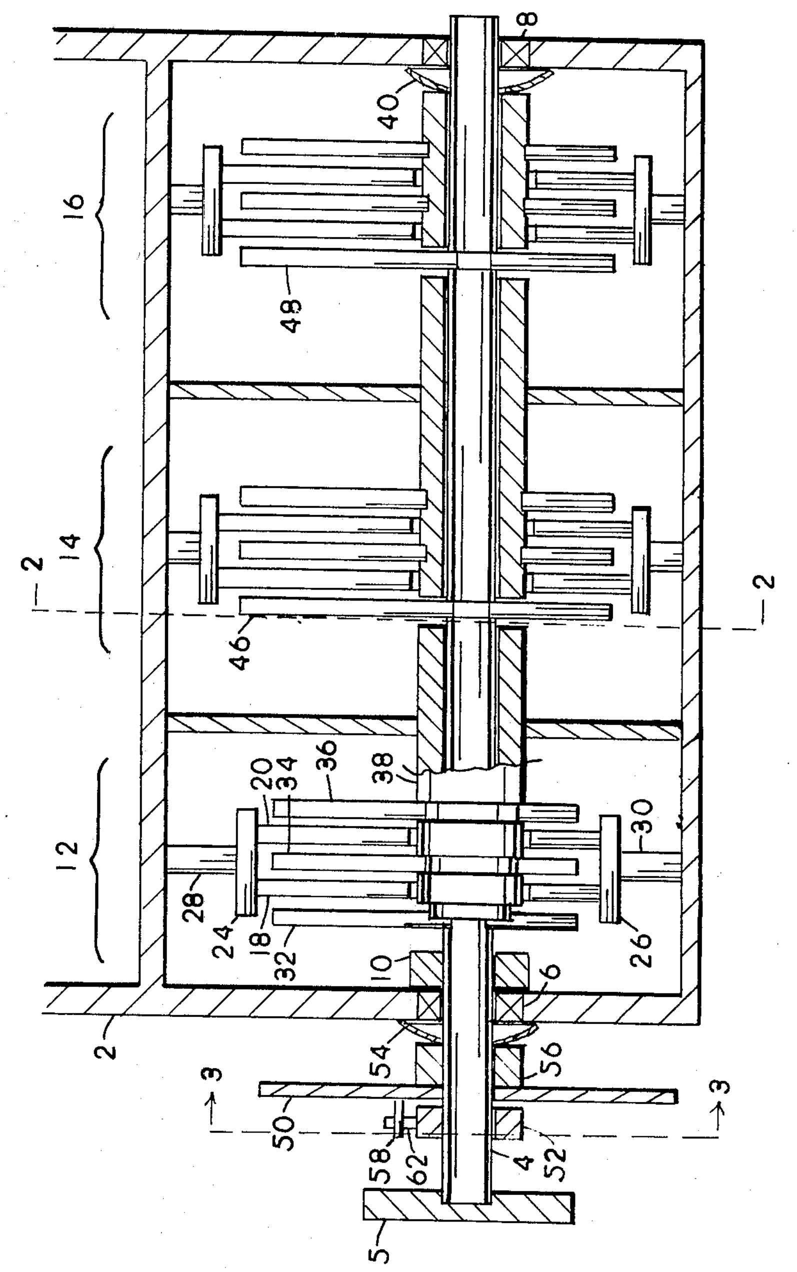
FIG. 1 is a sectional view of the variable capacitor section of a UHF tuner incorporating the present invention.

Referring to FIG. 1, a frame 2 encompasses the capacitor section of the tuner. Shaft 4 is rotatable in bearings 6 and 8. Collar 10 fixed to shaft 4 prevents axial movement of shaft 4 to the left. Consider capacitor section 12 which may be the oscillator section of the tuner. Stator plates 18 and 20 fixed to bases 24 and 26 are spaced from frame 2 by insulators 28 and 30. Rotor plate 32 is fixed to shaft 4. Rotor plates 34 and 36 are fixed to sleeve 38. Sleeve 38 is biased to the left against rotor plate 32. This bias is provided by washer spring 40 between the right end of sleeve 38 and frame 2. When shaft 4 is turned, the torque developed on sleeve 38 by spring 40 exceeds the torque developed on sleeve 38 by plate 32. Consequently sleeve 38 will tend to remain stationary as shaft 4 is turned. This result is achieved by proper choice of surface materials and bearing surface radii.

Figures 2, 3, 4:
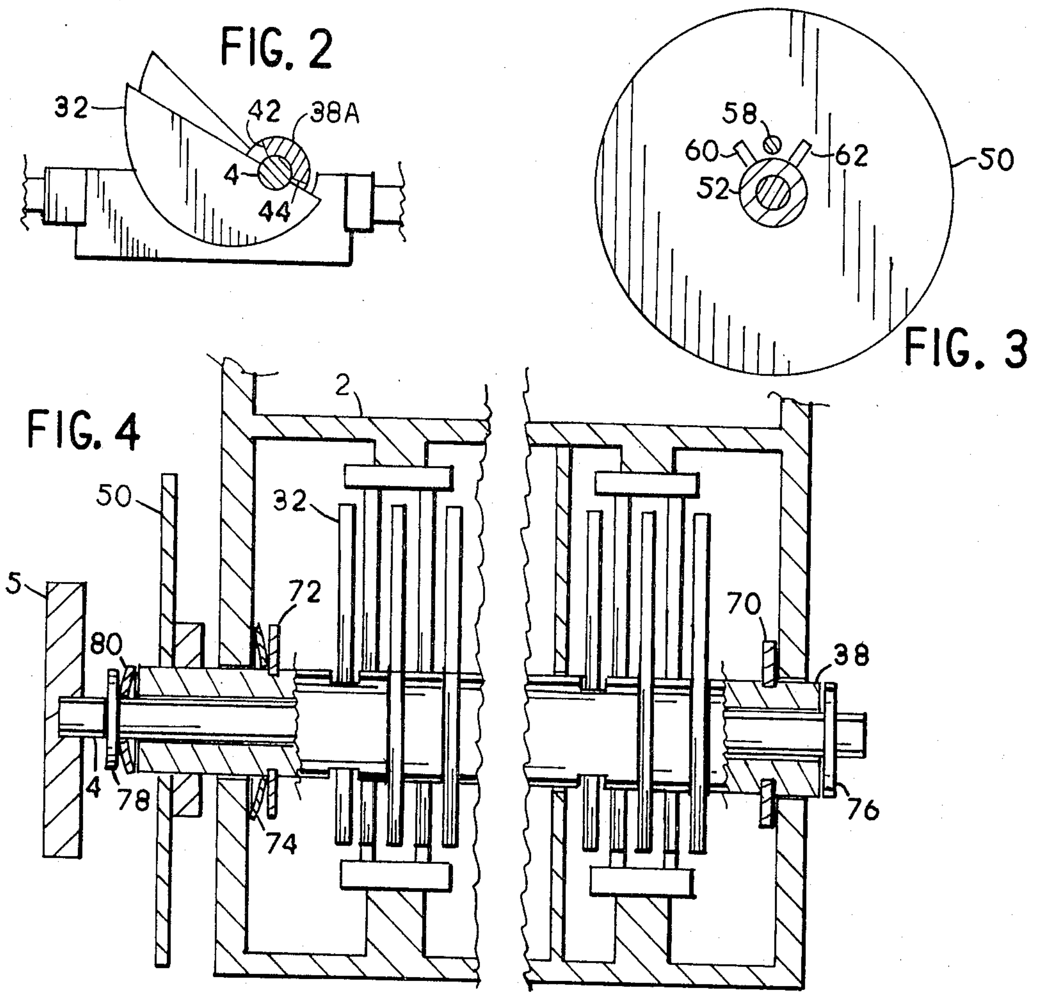
FIG. 2 is a sectional view along the lines indicated in FIG. 1.
FIG. 3 is a second sectional view taken along the line indicated in FIG. 1.
FIG. 4 is a sectional view of an alternate configuration of a tuner incorporating the present invention.

However, the arc through which shaft 4 may turn without associated turning of sleeve 38 is limited by overhang 38A, as indicated in FIG. 2. Clockwise rotation of shaft 4 causes plate 32 to engage surface 42 of sleeve 38. Further turning of shaft 4 will be attended by simultaneous turning of sleeve 38. If shaft 4 is turned counter-clockwise a similar action involving surface 44 ensues. The arrangement is such that shaft 4 may be rotated through a dead zone for which sleeve 38 is not turned. When shaft 4 is turned beyond this dead zone, sleeve 38 is turned. While shaft 4 is turned within the dead zone, the capacitance of the section is changed slowly. Outside the dead zone, the capacitance is changed rapidly. Each reversal of direction following rotation outside the dead zone is followed by rotation within the dead zone during which time the tuner is fine tuned for accurate adjustment of resonant frequency.

Sleeve 38 is slotted in positions opposite rotor plate 46 of section 14 and opposite plate 48 of section 16. The slots permit plates 46 and 48 to be fixed to shaft 4 and to rotate freely through the dead zone.

Channel indication is provided by disc 50 bearing numerals and pivoted on shaft 4. Disc 50 is fixed to hub 56. Collar 52 is fixed to shaft 4. Washer spring 54 presses disc 50 to the left against collar 52. Bearing surfaces and radii are such that disc 52 tends to remain stationary when shaft 4 is rotated. Referring to FIG. 3, pin 58 fixed in disc 50 rests between pins 60 and 62 fixed in collar 52. The arrangement is such that shaft 4 can rotate through a dead zone before picking up disc 50. The dead zone is the same size as the dead zone through which shaft 4 can rotate without picking up sleeve 38. It follows that disc 50 will indicate generally the station to which the tuner is tuned. If the numerals placed on the disc are correct for the positioning of shaft 4 in the center of its dead zone, the maximum error of indication will correspond to half the dead zone.

In the alternate configuration illustrated in FIG. 4, sleeve 38 extends through the bearings. Collar 70 fixed to sleeve 38 prevents sleeve 38 from moving to the right. Collar 72 fixed to sleeve 38 presses against washer spring 74 which in turn presses against frame 8. Collar 76 fixed to shaft 4 prevents shaft 4 from moving to the left. Collar 78 fixed to shaft 4 presses against washer spring 80 which in turn presses against sleeve 38. The capacitor sections have the same configuration as sections 14 and 16 of FIG. 1. This system has the advantage that the dial plate may be fixed directly to the sleeve.

Figure 5:
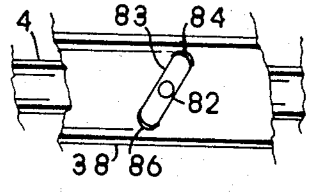
FIG. 5 is a partial view of the shaft mechanism of a second alternate configuration of a tuner incorporating the present invention.

In one other possible alternate configuration, vernier action is obtained by causing shaft 4 to move axially of sleeves 38 as illustrated in FIG. 5. Pin 82 fixed in shaft 4 moves in slot 83 of sleeve 38. Turning of shaft 4 causes pin 82 to move in slot 83 until it engages face 84 or 86. Thereafter sleeve 38 turns with shaft 4. Movement of pin 82 in slot 83 causes axial movement of shaft 4 and attached plates. Axial movement of the attached plates effects vernier tuning action.

Claimed are the following:

1. A variable capacitor type tuning arrangement for a UHF tuner comprising a frame, one or more capacitor stator sections fixed to said frame, a sleeve adapted to be rotated relative to said frame about the axis of said sleeve, one or more capacitor rotor sections fixed to said sleeve, a shaft passing axially of said sleeve and adapted to be rotated for tuning, one or more vernier plates fixed to said shaft and extending radially therefrom through openings in said sleeve, said vernier plates being positioned relative to said stator sections that rotation of said vernier plates produced by rotation of said shaft varies the capacitance between said vernier plates and said stator sections, and dead zone coupling means between said shaft and said sleeve causing said sleeve to rotate with said shaft when said shaft is at the limits of said dead zone.

2. A tuning arrangement as in claim 1, said variation of capacitance between said vernier plates and said stators being caused by axial movement of said vernier plates relative to said stator, said axial movement being produced by a slanted slot in said sleeve in which moves a pin fixed to said shaft.

3. A tuning arrangement as in claim 1, said variation of capacitance between said vernier plates and said stators being caused by axial movement of said vernier plates relative to said stators, said axial movement being produced by a cam positioned between said sleeve and said shaft.

4. A tuning arrangement as in claim 1, said sleeve passing through bearings in said frame.

5. A tuning arrangement as in claim 1, said shaft passing through bearings in said frame.

6. In a UHF tuner for TV reception, a frequency determining element having one or more variable capacitor sections, each capacitor section having a stator consisting of one or more stator plates, a sleeve affixed to which are coarse plates adapted in response to rotation of said sleeve to vary the capacitance between said coarse plates and said stator plates, a shaft passing axially through said sleeve, fine rotor plates affixed to said shaft by means of connectors passing through openings in said sleeves and adapted in response to rotation of said shaft for varying the capacitance between said fine rotor plates and said stator plates, coupling means between said shaft and said sleeve providing a dead zone within which said shaft rotates independently of said sleeve for a short distance but causing said shaft to engage and turn said sleeve for greater rotation of said shaft, means for causing the torque required to rotate said shaft in said sleeve to be less than the torque required to rotate said sleeve relative to said frame while said shaft is within said dead zone.

7. A variable capacitor having a frame, a stator consisting of one or more plates fixed to said frame, a sleeve adapted for rotation in said frame and carrying rotor plates juxtaposed said stator plates and adapted on rotation of said sleeve for varying the capacitance between said rotor plates and said stator plates, a shaft passing axially through said sleeve, connector means fixed to said shaft and passing through openings in said sleeve, said connector means making connection between said shaft and one or more rotor plates juxtaposed said stator plates and adapted on rotation of said shaft for varying the capacitance between said shaft plates and said stator plates, and dead zone coupling means between said shaft and said sleeve.

8. A variable capacitor as in claim 7 and having torque resistive means between said sleeve and said frame greater in value than torque resistive means between said shaft and said sleeve.

9. In a TV type UHF tuner utilizing a variable capacitor type tuning system having a frame and one or more capacitor sections having stator plates and rotor plates, a sleeve bearing rotor plate, a fine tuning shaft inside said sleeve and aligned axially therewith, fine tuning rotor plates affixed to said shaft by connectors passing through openings in said sleeve, said fine tuning rotor plates juxtaposed said stator plates so that rotation of said shaft varies the capacitance between said fine tuning rotor plates and said stator plates, and means causing said sleeve to rotate with said fine tuning shaft after limited rotation of said fine tuning shaft within said sleeve.

10. A system as in claim 9 and having friction means between said sleeve and said frame, said friction means providing a greater resistive torque to rotation of said sleeve in said frame than the resistive torque to rotation of said shaft within said sleeve when said shaft is within its dead zone.

References Cited

UNITED STATES PATENTS

| | | | |
|---|---|---|---|
| 1,870,084 | 8/1932 | Apple | 317—254 |
| 2,313,429 | 3/1943 | Goddard | 317—253 |

LEWIS H. MYERS, *Primary Examiner.*

E. A. GOLDBERG, *Assistant Examiner.*